United States Patent [19]

Steinleitner

[11] 4,401,731
[45] Aug. 30, 1983

[54] ELECTROCHEMICAL STORAGE CELL

[75] Inventor: Günther Steinleitner, Schriesheim, Fed. Rep. of Germany

[73] Assignee: Brown, Boveri and Cie AG, Käfertal, Fed. Rep. of Germany

[21] Appl. No.: 293,951

[22] Filed: Aug. 18, 1981

[30] Foreign Application Priority Data

Sep. 5, 1980 [DE] Fed. Rep. of Germany ....... 3033438

[51] Int. Cl.³ ............................................. H01M 2/08
[52] U.S. Cl. ...................................... 429/104; 429/185
[58] Field of Search ................................ 429/104, 185

[56] References Cited

U.S. PATENT DOCUMENTS

| 4,048,391 | 9/1977 | Tilley et al. | 429/104 |
| 4,105,834 | 8/1978 | Baker et al. | 429/104 |
| 4,215,466 | 8/1980 | Bindin | 429/104 |
| 4,234,668 | 11/1980 | Park et al. | 429/104 |
| 4,245,012 | 1/1981 | Mikkor | 429/104 |

FOREIGN PATENT DOCUMENTS 2290766 12/1976 France ................................ 429/104

Primary Examiner—Donald L. Walton
Attorney, Agent, or Firm—Herbert L. Lerner; Laurence A. Greenberg

[57] ABSTRACT

An electrochemical storage cell based on alkali metal and chalcogen with an anode space and a cathode space separated from each other by an alkali ion-conducting solid electrolyte. The cell is bounded by a metallic housing. A closure seals the top of the cell in a sealing zone. The open end of the can shaped solid electrolyte disposed in the interior of the cell is bonded by a bonding material to a ring-shaped insulating part which defines the two reactant space relative to each other in the sealing zone. In the sealing zone of the storage cell closure, the metallic housing as well as the solid electrolyte and the insulating part fastened to it are covered by a protective layer.

10 Claims, 3 Drawing Figures

ELECTROCHEMICAL STORAGE CELL

BACKGROUND OF THE INVENTION

1. Field of the Invention

The invention relates to an electromechanical storage cell based on alkali metal and chalcogen with at least one anode space to receive the anolyte and one cathode space to receive the catholyte. The spaces are separated from each other by a solid, alkali ion conducting electrolyte and bounded, at least zonewise, by a metallic housing. The solid electrolyte is designed in can shape and positively bonded at its open end, by a bonding material, to at least one ringshaped insulating part which limits the two reactant spaces relative to each other in the sealing zone of the storage cell closure.

2. Description of the Prior Art

Such rechargeable electrochemical storage cell with solid electrolytes are very well suited for the construction of storage batteries of high energy and power density. The solid electrolytes used in the alkali/chalcogen storage cells and made of beta aluminum oxide, for instance, are characterized in that the part conductivity of the moving ion is very high and the part conductivity of the electrons lower by many decimal powers. The use of such solid electrolytes for the construction of electrochemical storage cells achieves practically no self-discharge taking place because the conductivity of the electrons is negligible and the reaction substances cannot penetrate the solid electrolyte as neutral particles.

One specific example of such rechargeable electrochemical storage cells are those based on sodium and sulfur with a solid electrolyte made of beta aluminum oxide. One advantage of these electrochemical storage cells is that no secondary electrochemical reactions take place while charging. The reason for this is again that only one kind of ion can penetrate the solid electrolyte. Therefore, the current yield of such a sodium/sulfur storage cell is nearly 100%. Compared to the lead storage battery, the ratio of energy content to total weight of such a storage cell is very high in these electrochemical storage cells because the reacting substances are light and much energy is released in the electrochemical reaction. Thus, electrochemical storage cells on sodium and sulfur basis have considerable advantages over conventional storage batteries such as lead storage batteries.

Of disadvantage in these electrochemical storage cells is that they are kept at high operating temperatures of about 300° to 500°C. in order that required chemical reactions will proceed in the desired manner for charging and discharging. At these temperatures, considerable material problems are encountered. In particular, incompatibilities will develop between the structural materials used for the production of the storage cells and the reactants, especially the sodium and the sulfur. In the closure zone of this storage cell, where the openings of the reactant spaces meet, corrosion will occur despite the careful sealing of these spaces against each other. Until now, the elimination of corrosion has been insufficient.

An electrochemical storage cell in which the metallic storage cell housing is provided in its opening zone with a flange pointing inwardly is known from the German Published Non-Prosecuted Application DE-OS No. 2 556 279. This flange supports the solid electrolyte. The latter is provided with a flange pointing outwardly and resting against the metallic housing flange. The solid electrolyte flange is formed by a ringshaped insulating part fastened to the solid electrolyte tube by means of a special bonding material. The ringshaped insulating parts are preferably fastened on the outside to the open end of the solid electrolyte by means of a glass solder. Disposed between this insulating part and the metal housing flange on which it sits is a metallic gasket in the form of a dual-sided diamond edge washer. The opening of the solid electrolyte is closed by a metallic cover resting on the solid electrolyte flange. Another dual-sided diamond edge washer is disposed between the cover and the solid electrolyte flange.

U.S. Pat. No. 4,037,027 discloses an electrochemical storage cell in which the reactant spaces are sealed against each other and to the outside by the thermocompression method. It is by this method that the metallic housing parts are joined to the ceramic insulating ring of the solid electrolyte.

In these known solutions corrosion problems still persist inasmuch as the reaction substances of the reagents react chemically with the materials of the components located in the sealing zone. This causes corrosion products to develop with interfere with the electrochemical reactions or which corrode through the housing or the sealing elements of the electrochemical storage cell. With this, the tight seal between the reactant spaces on the one hand and of the entire storage cell towards the outside is lost. The glass used to bond the solid electrolyte tube to the insulating ring is particularly susceptible to corrosion. The glass is attacked by the sodium located in the interior of the can-shaped solid electrolyte in most electrochemical storage cell embodiments. The metallic housing of the storage cell, in turn, is subjected to corrosive actions by the sulfur and the sodium polysulfide which is formed, or by the vapors developing, especially in the sealing zone of the storage cell closure.

SUMMARY OF THE INVENTION

Accordingly, it is an object of the invention to provide an electrochemical storage cell in which the reactant spaces are durably sealed against each other and to the outside and all storage cell components are protected to be corrosion resistant.

With the foregoing and other objects in view, there is provided in accordance with the invention an electrochemical storage cell based on alkali metal and chalcogen with at least one anode space to receive the alkali metal anolyte and a cathode space to receive the chalcogen catholyte, which spaces are separated from each other by an alkali ion conducting solid electrolyte and are bounded by a metallic housing, a closure in a sealing zone at the top of the storage cell where openings of the reactant spaces meet, the solid electrolyte having a can shape and bonded at its open end by a bonding material to a ringshaped insulating part which defines the two reactant spaces relative to each other in the sealing zone of the storage cell closure, the combination therewith wherein, in the sealing zone of the storage cell closure the metallic housing as well as the solid electrolyte and the insulating part fastened to it are covered by a protective layer.

Other features which are considered as characteristic for the invention are set forth in the appended claims.

Although the invention is illustrated and described herein as embodied in electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
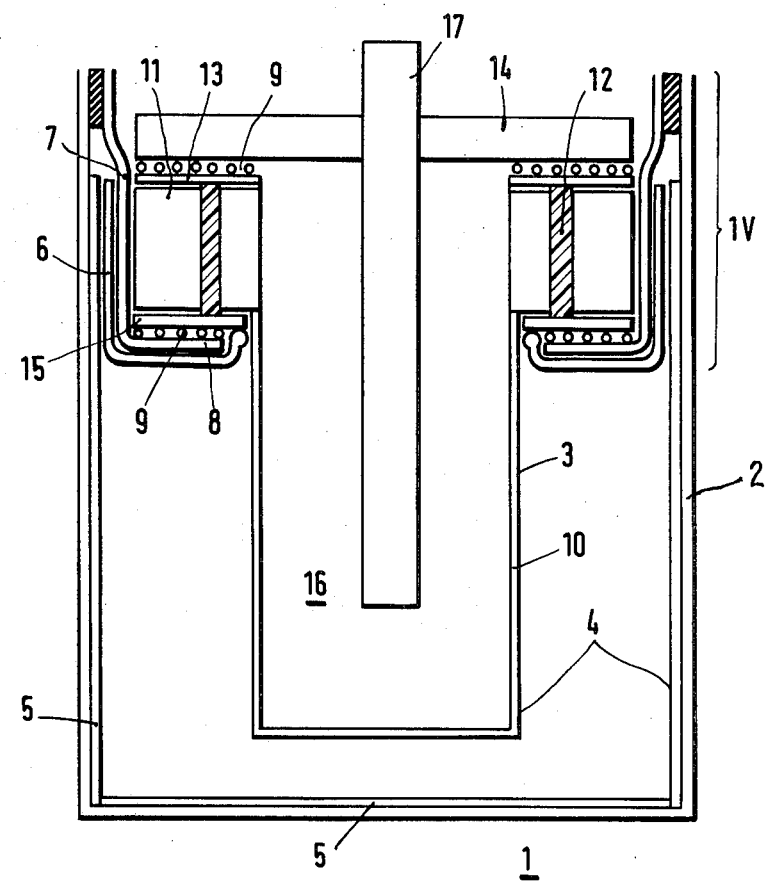
FIG. 1 diagrammatically illustrates an electrochemical storage cell in accordance with the invention, having a can-shaped metal housing, an interior solid electrolyte tube with its open top end connected to a ring-shaped insulating part. A sleeve attached at one end to the metal housing surrounds the insulating part and then extends under the insulating part in the form of a flange as a bearing support for the solid electrolyte. A protective layer extends along the entire underside of the flange and is folded upwardly to protect the sleeve.

In the storage cell of the kind described at the outset, at least in the sealing zone of the storage cell closure, shown in the drawings by a bracket with Roman numeral IV, at least the metal housing and the solid electrolyte and the insulating part fastened to it are covered, at least zonewise, by at least one protective coating each.

In one embodiment of the invention, both the top and bottom sides of the ringshaped insulating part receive a protective coating. These two protective coatings also cover the bonding material with which the insulating part is bonded to the solid electrolyte. The dimensions of the two protective coatings are selected so that they also cover the outwardly pointing rim of the solid electrolyte to which the insulating part is bonded. Advantageously, these two protective coatings are designed as metallic washers. These two washers are made of a thermocompression material. The two washers are positively bonded to the insulating part as well as to the solid electrolyte.

The protective coating of the metallic storage cell housing is disposed at least in its interior. The protective coating is preferably provided in the opening zone of the metallic housing. It is inserted into the metal housing so as to cover its inside surfaces like a lining.

In one embodiment of the invention this protective coating is retained in the interior of the metallic housing by means of a sleeve. The sleeve is preferably fastened inside at the open end of the metallic housing. The sleeve used for retention has a flange directed inwardly. The protective layer of the housing is of cylindrical shape and pushed between the sleeve and the metal housing. The sleeve diameter is selected only slightly smaller than the inside diameter of the metallic housing to avoid loosening of the protective layer. The flange of this sleeve is covered, at least on its side facing the reactant space, by the protective layer of the metallic housing. The protective layer extends preferably over the entire underside of the flange and is folded upwardly at the flange rim. The sleeve flange serves to retain the solid electrolyte disposed inside the metallic housing. In particular, the insulating ring bonded to the solid electrolyte tube is in contact with and supported by the flange.

In another embodiment of the invention the protective layer of the metallic housing is applied directly to the latter's inside surfaces. In this embodiment, all inside surfaces of the metallic housing are covered. In the storage cell embodiments where the protective layer is applied directly to the inside surfaces of the metallic housing, the metallic housing has at its open end a flange pointing inward or outward. The insulating part bonded to the solid electrolyte is placed on this flange. In these two embodiments, the underside on topside, respectively, of the inwardly or outwardly directed flange is covered by the protective layer of the metal housing. Advantageously, a thermocompression material is used to produce the protective layer of the metal housing. Aluminum and titanium are particularly well suited as thermocompression material. An aluminum alloy or titanium alloy may also be used. A metallic cover serves as a closure for the solid electrolyte. It is placed on the protective layer disposed on the insulating part and the rim of the solid electrolyte. To assure that the storage cell is hermetically sealed to the outside, the topside washer is positively bonded to the metallic cover. If required, a diffusion barrier may be disposed between the cover and the washer. Another diffusion barrier may also be disposed between the washer disposed at the underside of the insulating part and the inwardly pointing flange of the sleeve or metal housing. Such a diffusion barrier is preferably put between metallic components which in turn are positively connected to metallic components made of a thermocompression material. This diffusion barrier prevents weakening of the joint area due to the formation of brittle, intermetallic intermediate layers. The two washers disposed on the topside and underside of the insulating part and serving as protective layers are positively bonded to the metallic components adjoining them by means of the known thermocompression method in advantageous manner. The same method is also used to fasten the protective layer disposed between the sleeve and the metallic housing to the underside of the flange of this sleeve.

In one embodiment of the invention the insulating part is bonded to the outwardly strengthened rim of the solid electrolyte by means of a glass solder. The insulating part may also be bonded to the solid electrolyte by means of a soft metal. A thermocompression material is preferably used for this purpose. By the same token, the insulating part may also be retained on the solid electrolyte by the two washers provided as protective layers. This is due to the two washers being positively joined to the topside and underside of the insulating part as well as to the topside and underside of the outwardly strengthened rim of the solid electrolyte.

The invention is explained below with reference to drawings.

The electrochemical storage cell 1 shown in FIG. 1 is formed essentially of a canshaped housing 2 made of metal and a solid electrolyte 3. The canshaped metal housing 2 involves a tube closed at one end and made of alloy steel, for instance. The canshaped housing 2 may also be made of a cheap, low-alloy steel. Disposed inside this metallic housing 2 is the canshaped solid electrolyte 3. The solid electrolyte 3 shown here is made of beta aluminum oxide. The dimensions of the solid electrolyte 3 are selected so that a coherent interspace 4, serving as cathode space, is formed between its outside surfaces and the inside surfaces of the metallic housing 2. The inner limiting surfaces of the metallic housing 2 are coated by a corrosion protection 5 such as a graphite foil. This prevents the destruction of the metallic housing 2, especially by sodium polysulfide forming during the discharge of the storage cell. The inside of the metallic housing 2 in the area of its opening, is provided with an additional protective layer 6. The latter lines the upper area of housing 2 and its inside surfaces like a sleeve. This protective layer 6 is preferably made of a thermocompression material. A sleeve 7 is provided for the retention of the protective layer. One end of the sleeve 7 is positively fastened to the open end of the metallic housing 2 at the inside of the latter's limiting surfaces. Preferably, the sleeve 7 is welded on the inside to the open end of the metallic housing. The inside diameter of sleeve 7 is slightly smaller than the inside diameter of the canshaped housing 2. The protective layer 6 is bent cylindrically and pushed between the metallic housing 2 and the sleeve 7. Due to the close spacing between metallic housing 2 and sleeve 7 the protective layer 6 is seated firmly so that it cannot detach itself from this clamplike detention. The other end of sleeve 7 is provided with a flange 8 pointing inward. The width of this flange 8 is of such size that it covers the cathode space 4 located between the metallic housing 2 and the solid electrolyte 3. The sleeve 7 and its flange 8 may be made of alloy steel. For cost reasons the sleeve and its flange may also be made of a cheap, low-alloy steel. To protect the sleeve 7 and its flange 8 against damage by the sulfur in the cathode space 4, the protective layer 6 of the metallic housing 2 extends along the entire underside of flange 8 and is folded upwardly at the latter's rim. This measure completely prevents a direct contact between the sleeve 7 and the sulfur in the cathode space 4. The protective layer 6 is pushed with great force against the metallic housing 2 by the sleeve 7. What this achieves is that no sulfur vapors can penetrate between the metallic housing 2 and the protective layer 6.

As already mentioned earlier, the protective layer 6 consists of a thermocompression material. In particular, an aluminum or aluminum alloy sheet is used to produce the protective layer. A titanium or titanium alloy sheet is also suitable for this purpose. To fasten the protective layer 6 to the flange 8 of sleeve 7, it is positively joined to the flange 8, using the compression method. The compression method cited here is part of the state of the art. It is described later in detail in connection with the production of the storage cell.

In the embodiment example described here, the length of sleeve 7 is such that its flange 8 can serve as a support surface for the solid electrolyte 3 disposed inside the metallic housing 2. The solid electrolyte disposed inside the canshaped housing 2 is formed by a tube which is closed at one end and made of beta aluminum oxide. At its open end the tube 10 has an outwardly directed, strengthened rim to which a ringshaped insulating part 11 is attached. The inside diameter of this ringshaped insulating part 11 is slightly larger than the outside diameter of the beta aluminum oxide tube 10. The insulating part 11 is positively bonded to the beta aluminum oxide tube 10, using a bonding material 12 of glass solder. A metal, especially a metal serving as thermocompression material, may also be used as bonding material. For this purpose aluminum or an aluminum alloy or titanium or a titanium alloy may be employed. The surfaces of the insulating part 11 and beta aluminum oxide tube 10 are covered by a protective layer 13 common to both. The protective layer 13 is designed as washer. Its inside diameter matches the inside diameter of the beta aluminum oxide tube 10. The outer limit of this washer 13 lies in the same plane as the outer limit of the ringshaped insulating part 11.

Above all, this protective layer 13 also covers the material 12 bonding the insulating part 11 to the beta aluminum oxide tube 10. Placed on the washer 13 is a metallic cover 14. Its outer limits lie in the same plane as the ringshaped insulating part 11. The underside of the metallic cover 14 may be provided with an oxide film, particularly in the area of the washer 13, to form a diffusion barrier 9 which prevents weakening of the joint area due to the formation of brittle intermetallic intermediate layers.

The washer 13 is preferably made of thermocompression material, desirably an aluminum or titanium sheet. Also usable for the production of the washer 13 is an aluminum or titanium alloy. The washer 13 serves primarily as a protective layer for the insulating part 11 made of alpha aluminum oxide and for the bonding material 12. The latter must be protected above all against the alkali metal, specifically the sodium used here. The washer 13 is positively bonded to the surfaces of the beta aluminum oxide tube 10 and of the insulating part 11 as well as to the underside of the cover 14. This is also done by the thermocompression method mentioned above.

A second protective layer 15 for the insulating part 11 and the bonding material 12 is disposed at the underside of the insulating part 11. This protective layer 15 is also formed by a metallic washer whose inside diameter matches the outside diameter of the beta aluminum oxide tube 10. The outside diameter of the washer 15 corresponds to the outside diameter of the insulating part 11. The washer is made of the same material as the already described washer 13. It is also positively bonded to the insulating part 11 and to the rim of the beta aluminum oxide tube 10. The ringshaped insulating part 11, preferably made of alpha aluminum oxide, is bonded to the beta aluminum oxide tube 10 by means of a glass solder or a soft metal. Due to the positive bonding of the two washers 13 and 15 to both the beta aluminum oxide tube 10 and the insulating part 11 the bonding material 12 may possibly be omitted because the insulating part 11 is adequately retained at the beta aluminum oxide tube 10 by the washers 13 and 15.

The sleeve 7 provided to retain the protective layer 6 of the metallic housing 2 has an inwardly directioned flange 8. Placed on this flange 8 is the ringshaped insulating part 11. The washer 15, serving as a protective layer 15, then rests directly on the surface of flange 8. If required, an oxide film may be applied to the surface of flange 8 to form a diffusion barrier. The washer 15 is positively bonded to the surface of flange 8 by the compression method. The protective layer 6 of the metallic housing 2 extends additionally along the underside of flange 8 and is folded upwardly so far that its end contacts the washer 15 and is joined to it gastight. This precludes corrosion of sleeve 7.

As already mentioned above, the interspace between the metallic housing 2 and the solid electrolyte 3 serves as cathode space 4. In the embodiment example shown here it is filled with sulfur and, if applicable, additionally with a graphite felt. The metallic housing 2 serves as cathodic current collector. The interior of the solid electrolyte 3, in particular the beta aluminum oxide tube 10 forming it, serves as anode space 16, filled with liquid sodium. A metal tube 17, penetrating the metallic cover 14 and positively fastened to it, protrudes into the solid electrolyte 3. In the production of the storage cell 1 the tube 17 is used first to fill the anode space with sodium. Later it assumes the task of the anodic current collector. The anode space 16 may be connected to a sodium reservoir (not shown here), provided above the cover 14, through an opening in the cover 14 (not shown here).

Figure 2:
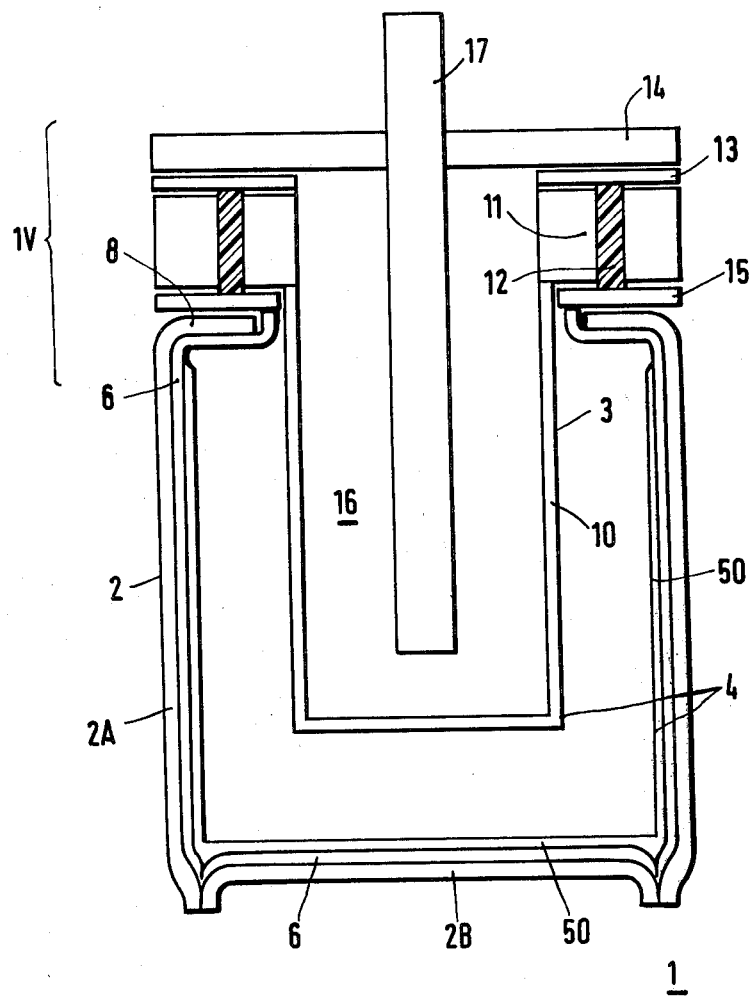
FIG. 2 is a variant of the electrochemical storage cell shown in FIG. 1 and it will be noted that the metallic housing at its top end is turned inwardly to form a flange as a bearing support for the solid electrolyte and that the inner surface of the flange and housing are covered by a protective layer.

FIG. 2 shows a variant of the storage cell according to the invention. It is formed essentially of a metallic housing 2 and a solid electrolyte 3. The canshaped housing 2 is made of a metallic tube 2A. This tube may be made of alloy steel or of a cheap, low-alloy steel. The first end of this tube 2 is closed by a round disc 2B, forming the bottom of the metallic housing 2. The round disc is made of the same material as the tube 2A and is welded to it. At its second end, the tube 2A is bent inwardly to form a flange 8. This flange serves as bearing surface for the solid electrolyte 3. The inside surfaces of the tube 2A and bottom 2B are each coated by a completely closed protective layer 6. The protective layer is formed by a thermocompression material. Preferably, aluminum or titanium, or an aluminum or titanium alloy, is used for the coating. The protective layer 6 is applied to the inside surfaces of tube 2A and bottom 2B, using known methods. The flange 8, formed by bending the tube 2A inwardly, is also covered on its underside by the protective layer 6. If required, another corrosion protection 50 may be applied to this protective layer 6. A graphite foil, for instance, is suitable for this purpose, but other suitable materials may, of course, also be used. The solid electrolyte 3 is disposed in the interior of the metallic housing 2. In the embodiment example described here, the solid electrolyte 3 is formed by a beta aluminum oxide tube 10 closed at one end. Attached to the strengthened outer rim in the area of the opening of this tube is a ringshaped insulating part 11. It consists preferably of alpha aluminum oxide. The insulating part 11 is bonded to the beta aluminum oxide tube 10 by a bonding material 12 such as a glass solder or a soft metal. The dimensions of the beta aluminum oxide tube 10 are selected so that a coherent interspace 4 is formed between its outer limiting surfaces and the inner limiting surfaces of the metallic housing 2. In the embodiment example shown here, this space serves as cathode space.

Analogous to the embodiment shown in FIG. 1 and described in the specification pertaining to it, two protective layers 13 and 15 are here also provided for the insulating part 11 and the bonding material 12. Again the two protective layers are formed by two washers 13 and 15. They are disposed on the topside and the underside of the insulating part 11. At the same time, they cover the bonding material 12 and the outwardly strengthened rim of the beta aluminum oxide tube 10. The two washers 13 and 15 are made of a thermocompression material. Metals suitable for this purpose have been mentioned above. Using the thermocompression method, the two washers 13 and 15 are bonded positively and gastight to both the insulating part 11 and the beta aluminum oxide tube 10. The top of the storage cell 1 is closed by a metallic cover 14 placed on the washer 13. The cover is also bonded by the thermocompression method positively and gastight to the washer 13. The insulating part 11, its underside protecting the protective layer 15, is placed on top of the inwardly pointing flange of the metallic housing 2. Here again, as in the embodiment example according to FIG. 1, the protective layer 15 is bonded positively and gastight to the beta aluminum oxide tube 10 and the insulating part 11 as well as to the topside of flange 8. The bond can be produced using the thermocompression method. The protective layer 6, covering the inside surfaces of housing 2, extends upwardly beyond the inside rim of flange 8 and is joined gastight to the protective layer 15. Due to this measure, the surfaces of the metallic housing 2 which define the cathode space 4 are lined in sleevelike fashion by the protective layer 6 and additionally by the protective layer 15 so that they are nowhere in direct contact with the sulfur or the sodium polysulfide forming while the storage cell discharges. Again, the metallic housing serves as the cathodic current collector. The interior of the beta aluminum oxide tube 10 forms the anode space 16 which is filled with liquid sodium. A metal tube 17, penetrating and fastened to the metallic cover 14, protrudes into the beta aluminum oxide tube 10. In the production of the storage cell, the metal tube 17 serves first to fill the anode space 16 with sodium. Later it assumes the task of the anodic current collector. If conditions so require, diffusion barriers may be provided here also between the protective layer 13 and the cover 14 on the one hand and between the flange 8 and the protective layer 15 on the other.

If conditions permit, the bonding material 12 may be omitted because, in this embodiment example, the insulating part 11 is positively joined to the beta aluminum oxide tube by the two protective layers 13 and 15.

The production of the storage cell shown in FIG. 1, using the thermocompression method, is described in the following.

In the production of the storage cell 1 the beta aluminum oxide tube forming the solid electrolyte 3 is first joined, using glass solder, to the ringshaped insulating part 11. Subsequently, the two washers 13 and 15 serving as protective layers are placed on top or on the underside of the insulating part and on the outwardly pointing rim of the beta aluminum oxide tube 10. The metallic cover 14 which is already assembled to the metal tube 17 serving as filler tube and current collector is placed on top of the washer 13. If it is intended to form a diffusion barrier between washer 13 and cover 14, the underside of cover 14 is provided with an oxide film. The stack thus formed, comprised of the above mentioned storage cell components, is subsequently compressed at a temperature slightly below the melting point of the thermocompression material. Pressing takes place at a temperature between 550° and 650° C., preferably at a temperature of 600° C. The components are pressed at a pressure ranging from 10 to 50 MPa, preferably at about 40 MPa. The pressing time is between 0 and 3 minutes, the stack being pressed preferably for 2 minutes. The procedure is preferably carried out in vacuum at a pressure $\leq 10^{-3}$ mbar. Pressing is also possible in a protective gas atmosphere such as an argon or nitrogen atmosphere.

After this pressing operation the solid electrolyte 3 thus sealed can be inserted in the canshaped housing 2. In so doing, the protective layer 15 disposed on the underside of the insulating part is placed on top of the flange 8. By applying the compression method again, the protective layer 15 can be bonded to the surface of flange 8. At the same time, the two ends of the protective layer 6 and of the protective layer 15 are joined together gastight.

Figure 3:
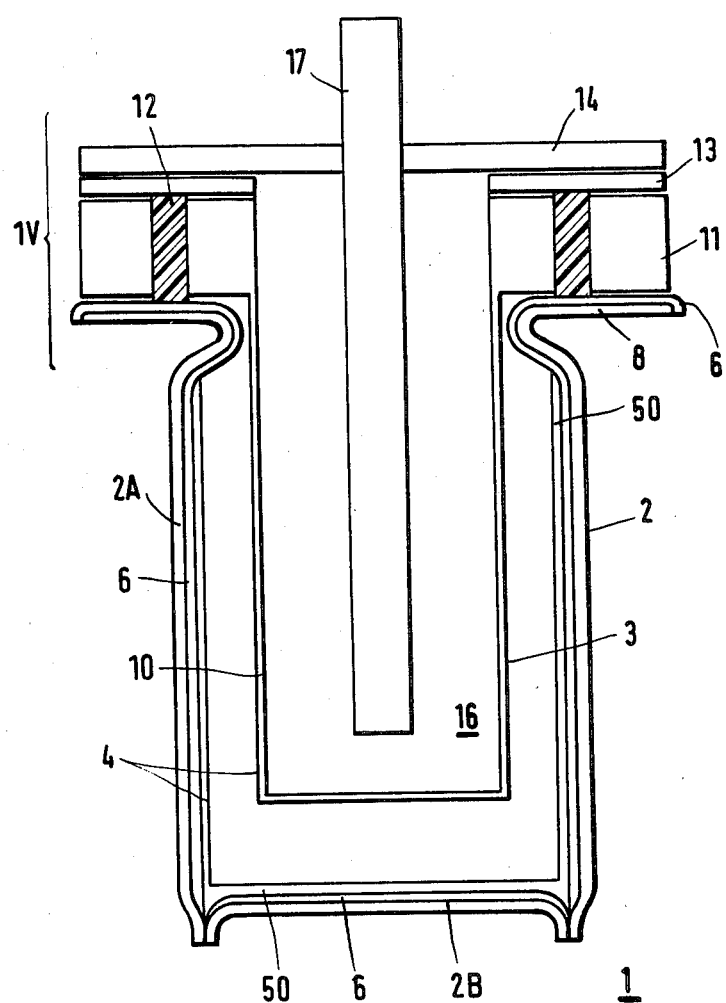
FIG. 3 is another embodiment of the electrochemical storage cell in which the top of the metal housing covered by a protective layer is turned outwardly to form a flange as a bearing support for the solid electrolyte.

Another embodiment example of the electrochemical storage cell is shown in FIG. 3. In essence, this embodiment corresponds to that shown in FIG. 2 and described in the specification pertaining to it. Equivalent components in FIG. 3 have the same reference symbols as in FIG. 2. The difference between the two embodiments is determined by the metallic housing 2. In particular, the metallic tube 2A forming the metallic housing 2 is bent outwardly at its second end. An outwardly pointing flange 8 is thus formed. In this embodiment too, all inside surfaces of the housing 2 are covered by a protective layer 6. Again a thermocompression material is used for this purpose. The surface of the outwardly pointing flange 8 is also covered by the protective layer 6. Here again, the flange 8 serves as bearing surface for the solid electrolyte 3. The latter is formed by the beta aluminum oxide tube 10. Again, a ring-shaped insulating part 11 is bonded by a bonding material 12 to the outside of the strengthened rim in the area of the opening of the beta aluminum oxide tube 10. The surfaces of the insulating part 11 as well as of the bonding material 12 and the outwardly pointing, strengthened rim of the beta aluminum oxide tube 10 are completely covered by the protective layer 13 which is again formed by a washer. Here too, a compression material is used to produce the washer 13. The cell closure is formed by the metallic cover 14. The protective layer 13 is positively or directly bonded to the solid electrolyte tube 10, to the insulating part 11 and to the cover 14. As already mentioned above, the surface of flange 8 on which is placed the solid electrolyte 3, in particular the insulating part 11 joined to it, is coated by the protective layer 6. The latter is formed by a thermocompression material so that the protective layer 15 can be omitted in this embodiment because the protective layer 6 assumes the function of the protective layer 15. In this embodiment of the storage cell it need only be seen to that the outwardly pointing, reinforced rim of the beta aluminum oxide tube is made sufficiently wide so that the joint between the insulating part 11 and the beta aluminum oxide tube 10 is covered by the protective layer 6. This can be assured by making the rim of the beta aluminum oxide tube wide enough to cover the reactant space located between the housing 2 and the solid electrolyte 3. Using the thermocompression method, the protective layer 6 can be joined to the rim of the beta aluminum oxide tube 10 and the insulating part 11. The protective layer 13 can be joined in the same manner to the beta aluminum oxide tube 10 and the insulating part 11 as well as the cover.

The embodiments of the storage cell described above can also be used when the reactant spaces are exchanged so that the interior of the solid electrolyte serves as the cathode space and the interspace between the metal housing and the solid electrolyte forms the anode space.

There are claimed:

1. Electrochemical storage cell based on alkali metal and chalcogen, with at least one anode space to receive the alkali metal anolyte and a cathode space to receive the chalcogen catholyte, which spaces are separated from each other by an alkali ion conducting solid electrolyte and are bounded by a metallic housing, a closure in a sealing zone at the top of said storage cell, said solid electrolyte having a can shape and bonded at its open end by a bonding material to a ring shaped insulating part which defines the two reactant spaces relative to each other in the sealing zone of the storage cell closure, the combination therewith wherein, in the sealing zone of the storage cell closure, the metallic housing as well as the solid electrolyte and the insulating part fastened to it are covered by a protective layer, wherein the protective layer of the metallic housing is disposed in the area of the latter's opening between the exterior of the solid electrolyte and the interior of the metallic housing, wherein the protective layer of the metallic housing is retained by means of a metallic sleeve, wherein the sleeve is fastened to the inside of the open end of the metallic housing, wherein the sleeve is provided with an inwardly pointing flange, and wherein the protective layer is bent cylindrically and pushed between the metallic housing and the sleeve.

2. Storage cell according to claim 1, wherein the flange of the sleeve is covered by the protective layer at least on the side facing the reactant space.

3. Storage cell according to claim 2, wherein the protective layer is folded upwardly around the inner rim of the flange and joined gastight to a protective layer covering the underside of the insulating part.

4. Electrochemical storage cell based on alkali metal and chalcogen, with at least one anode space to receive the alkali metal anolyte and a cathode space to receive the chalcogen catholyte, which spaces are separated from each other by an alkali ion conducting solid electrolyte and are bounded in some regions by a metallic housing, a closure in a sealing zone at the top of said storage cell, said solid electrolyte having a cup shape is connected at its open end to a ring-shaped insulating part which defines the two reactant spaces relative to each other in the sealing zone of the storage cell closure, the combination therewith wherein, in the sealing zone of the storage cell closure, the metallic housing is covered by a sheath-like protective layer which has an inward directed flange, wherein the solid electrolyte has an outward pointing rim, wherein the rim and the insulating part are covered on top and bottom sides by protective layers in the form of metallic washers, wherein a metallic sleeve fastened to the housing has an inward pointing flange reaching to the solid electrolyte, wherein said sheath-like protective layer is fastened by clamping between the housing and the sleeve, wherein the inward directed flange of the sheath-like protective layer extends over the inward pointing flange of the sleeve, wherein the metallic washers are made of a thermocompression material, wherein a diffusion barrier is disposed beneath the bottom metallic washer and another diffusion barrier disposed above the top metallic washer, wherein the insulating ring and the rim of the solid electrolyte are supported on the flange of the sleeve through the metallic washer made of thermocompression material serving as a protective layer and through the diffusion barrier beneath it, and wherein a cover plate is disposed on the insulating ring and the rim of the solid electrolyte with interposition of the top metallic washer made of thermocompression material serving as a protective layer and the diffusion barrier above it.

5. Storage cell according to claim 4, wherein the diffusion barrier is an oxide layer.

6. Electrochemical storage cell based on alkali metal and chalcogen, with at least one anode space to receive the alkali metal anolyte and a cathode space to receive the chalcogen catholyte, which spaces are separated from each other by an alkali ion conducting solid electrolyte and are bounded in some regions by a metallic housing, a closure in a sealing zone at the top of said storage cell, said solid electrolyte having a cup shape is connected at its open end to a ring-shaped insulating part which defines the two reactant spaces relative to each other in the sealing zone of the storage cell closure, the combination therewith, wherein the metallic housing is a metallic tube which has at its upper open end an inward pointing flange, and a bottom formed by welding-in a round metallic disc, wherein the interior surfaces of the tube, flange and disc are completely covered by a coherent protective layer onto which a corrosion protective coating is applied, wherein the solid electrolyte has an outward pointing rim, wherein the rim and the insulating part are covered on top and bottom sides by protective layers in the form of metallic washers made of thermocompression material, wherein the insulating ring and the rim of the solid electrolyte are supported on the inward pointing flange of the metallic housing through the bottom metallic washer, and wherein a cover plate is disposed on the insulating ring and the rim of the solid electrolyte with interposition of the top metallic washer.

7. Electrochemical storage cell based on alkali metal and chalcogen, with at least one anode space to receive the alkali metal anolyte and a cathode space to receive the chalcogen catholyte, which spaces are separated from each other by an alkali ion conducting solid electrolyte and are bounded in some regions by a metallic housing, a closure in a sealing zone at the top of said storage cell, said solid electrolyte having a cup shape is connected at its open end to a ring-shaped insulating part which defines the two reactant spaces relative to each other in the sealing zone of the storage cell closure, the combination therewith, wherein the metallic housing is a metallic tube which has at its upper open end an inward pointing flange, and a bottom formed by welding-in a round metallic disc, wherein the interior surfaces of the tube, flange and disc are completely covered by a coherent protective layer onto which a corrosion protective coating is applied, wherein the solid electrolyte has an outward pointing rim, wherein the insulating part is fastened to the rim through a soft metal, wherein the rim and the insulating part are covered on top by a protective layer in the form of a metallic washer made of thermocompression material, wherein the rim of the solid electrolyte and the insulating part fastened to the latter are placed directly on the surface of the flange of the housing, and wherein a cover plate is supported on the rim of the solid electrolyte and the insulating part with interposition of the metallic washer.

8. Storage cell according to claim 4 or 6 or 7, wherein the sheath-like protective layer is made of a thermocompression material.

9. Storage cell according to claim 4 or 6 or 7, wherein the sheath-like protective layer and the metallic washers are made of a thermocompression material selected from the group consisting of aluminum and titanium.

10. Storage cell according to claim 4 or 6 or 7, wherein the sheath-like protective layer and the metallic washers are made of a thermocompression material selected from the group consisting of aluminum alloy and titanium alloy.

* * * * *